US011689586B2

(12) United States Patent
Li

(10) Patent No.: US 11,689,586 B2
(45) Date of Patent: Jun. 27, 2023

(54) COMMUNICATION METHOD, APPARATUS, ELECTRONIC DEVICE, AND STORAGE MEDIUM

(71) Applicant: Alibaba (China) Co., Ltd., Hangzhou (CN)

(72) Inventor: Xiangjun Li, Hangzhou (CN)

(73) Assignee: Alibaba (China) Co., Ltd., Zheji (CN)

( * ) Notice: Subject to any disclaimer, the term of this patent is extended or adjusted under 35 U.S.C. 154(b) by 0 days.

(21) Appl. No.: 17/737,701

(22) Filed: May 5, 2022

(65) Prior Publication Data

US 2022/0368732 A1 Nov. 17, 2022

(30) Foreign Application Priority Data

May 12, 2021 (CN) .......................... 202110518868.0

(51) Int. Cl.
*H04L 65/403* (2022.01)
*H04L 65/1069* (2022.01)
*H04L 65/1104* (2022.01)

(52) U.S. Cl.
CPC ...... *H04L 65/1069* (2013.01); *H04L 65/1104* (2022.05); *H04L 65/403* (2013.01)

(58) Field of Classification Search
CPC . H04L 65/1069; H04L 65/1104; H04L 65/403
USPC ........................................................ 709/204
See application file for complete search history.

(56) References Cited

U.S. PATENT DOCUMENTS

2013/0139193 A1\* 5/2013 Fan ....................... H04L 65/612
725/25
2013/0342629 A1\* 12/2013 North ............... H04N 21/44008
348/E7.078

FOREIGN PATENT DOCUMENTS

WO WO-2016079364 A1 \* 5/2016 ......... H04N 21/4223

\* cited by examiner

*Primary Examiner* — Glenford J Madamba
(74) *Attorney, Agent, or Firm* — Lee & Hayes, P.C.

(57) ABSTRACT

Communication method, apparatus, electronic device and storage medium are provided. The communication method is applied to a video server having an IP network connection with a telephone network node, and includes: receiving a first video call including an identification of a first dialing device from the telephone network node based on the IP network connection; determining a first video channel with the first dialing device and second video channels with a first IP terminal device and a second IP terminal device, wherein the first dialing device and the telephone network node are located in a telephone network, and the first IP terminal device, the second IP terminal device and the video server are located in an IP network; and performing channel combination on the first video channel and the second video channels to establish a multi-party video call between the first dialing device and multiple IP terminal devices.

17 Claims, 11 Drawing Sheets

COMMUNICATION METHOD, APPARATUS, ELECTRONIC DEVICE, AND STORAGE MEDIUM

CROSS REFERENCE TO RELATED PATENT APPLICATIONS

This application claims priority to Chinese Patent Application No. 202110518868.0, filed on 12 May 2021 and entitled "Communication Method, Apparatus, Electronic Device, and Storage Medium," which is hereby incorporated by reference in its entirety.

TECHNICAL FIELD

The present disclosure relates to the technical field of computers, and in particular, to communication methods, apparatuses, electronic devices, and storage media.

BACKGROUND

Mobile communication technology is one of the important achievements of computer networks. Mobile communication technology has undergone the development of the first, second, third and fourth generation technologies. At present, the fifth generation mobile communication technology is the latest generation of cellular mobile communication technology, and is also an extension after 4G (LTE-A, WiMax), 3G (UMTS, LTE) and 2G (GSM) systems. The performance goals of 5G are high data rates, reduced latency, energy savings, lower costs, increased system capacity, and large-scale device connectivity.

The fifth generation mobile communication technology can support video call functions between mobile phones through a cellular network, but the communication cost still has room for improvement.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer readable instructions as permitted by the context above and throughout the present disclosure.

In view of this, embodiments of the present disclosure provide communication method, apparatus, electronic device, and storage medium to solve or alleviate the above-mentioned problems.

According to the present disclosure, a communication method is provided, which is applied to a video server having an IP network connection with a telephone network node. The method includes: receiving a first video call sent from the telephone network node based on the IP network connection, the video call including an identification of a first dialing device; determining a first video channel with the first dialing device and second video channels with a first IP terminal device and a second IP terminal device in response to the first video call, wherein the first dialing device and the telephone network node are located in a telephone network, and the first IP terminal device, the second IP terminal device and the video server are located in an IP network; and performing channel combination on the first video channel and the second video channels to establish a multi-party video call between the first dialing device and multiple IP terminal devices.

According to the present disclosure, a communication method is provided, which is applied to a video server having an IP network connection with a telephone network node. The method includes: obtaining a video call sent by an IP terminal device, the IP terminal device and the video server being located in an IP network; determining first media channels with a first dialing device and a second dialing device, and a second media channel with the IP terminal device in response to the video call, wherein the first dialing device and the second dialing device are located in a telephone network; and performing channel combination on the first media channels and the second media channel to establish a multi-party video call among the IP terminal device, the first dialing device, and the second dialing device.

According to the present disclosure, a communication method is provided, which is applied to a telephone network node having an IP network connection with a video server. The method includes: forwarding a received video call to the video server based on the IP network connection, wherein a dialing device that initiates the video call and the telephone network node are located in a telephone network; receiving a session request sent by the video server based on the IP network connection in response to the video call, and forwarding the session request to the dialing device; sending a session confirmation received from the dialing device to the video server based on the IP network connection to establish a video channel between the dialing device and the video server; and forwarding video call data between the dialing device and the video server based on the video channel.

According to the present disclosure, a communication method is provided, which is applied to a dialing device, and includes: sending a video call to a telephone network node; receiving a session request sent by the telephone network node in response to the video call request, the session request including an identification of the video server; establishing a video channel with the video server in response to the session request; and sending video call data to the telephone network node or receiving video call data from the telephone network node based on the video channel.

According to the present disclosure, a communication apparatus is provided, which is applied to a video server having an IP network connection with a telephone network node. The apparatus includes: a receiving module that receives a first video call sent by the telephone network node based on the IP network connection, the video call including an identification of a first dialing device; a determination module that determines a first video channel with the first dialing device and second video channels with a first IP terminal device and a second IP terminal device in response to the first video call, wherein the first dialing device and the telephone network node are located in a telephone network, the first IP terminal device, the second IP terminal device, and the video server are located in an IP network; and a combination module performs channel combination on the first video channel and the second video channels to establish a multi-party video call between the first dialing device and multiple IP terminal devices.

According to the present disclosure, a communication apparatus is provided, which is applied to a video server having an IP network connection with a telephone network node. The apparatus includes: an acquisition module that obtains a video call sent by an IP terminal device, the IP terminal device and the video server being located in an IP network; a determination module that determines first media channels with the first dialing device and the second dialing device and a second media channel with the IP terminal device in response to the video call, wherein the first dialing device and the second dialing device are located in a telephone network; and a combination module that performs channel combination on the first media channels and the second media channel to establish a multi-party video call among the IP terminal device, the first dialing device and the second dialing device.

According to the present disclosure, a communication apparatus is provided, which is applied to a telephone network node having an IP network connection with a video server. The apparatus includes: a first transceiver module that forwards a received video call to the video server based on the IP network connection, wherein a dialing device that initiates the video call and the telephone network node are located in a telephone network; a second transceiver module that receives a session request sent by the video server in response to the video call based on the IP network connection, and forwards the session request to the dialing device; a third transceiver module that sends a session confirmation received from the dialing device to the video server based on the IP network connection to establish a video channel between the dialing device and the video server; and a fourth transceiver module, that forwards video call data between the dialing device and the video server based on the video channel.

According to the present disclosure, a communication apparatus, which is applied to a dialing device, includes: a first transceiver module that sends a video call to a telephone network node; a second transceiver module that receives a session request sent by the telephone network node in response to the video call, the session request including an identification of a video server; an establishing module that establishes a video channel with the video server in response to the session request; and a third transceiver module that sends video call data to the telephone network node or receives video call data from the telephone network node based on the video channel.

According to the present disclosure, a communication device is provided. The device includes: a processor, a memory, a communication interface, and a communication bus. The processor, the memory and the communication interface complete mutual communication through the communication bus. The memory is used for storing at least one executable instruction. The executable instruction enables the processor to perform operations corresponding to the method according to any one of the first aspect to the fourth aspect.

According to the present disclosure, a storage medium storing a computer program is provided. When the program is executed by a processor, the method according to any one of the first to fourth aspects is implemented.

In the present disclosure, since a video server having an IP network connection with a telephone network node realizes a video channel with a dialing device located in the same telephone network of the telephone network node, the transmission of video data between the IP network and the telephone network is realized. In addition, since respective video channels of multiple IP terminal devices can be configured in the IP network, a multi-party video call between multiple IP terminal devices and the dialing device is realized, which improves the performance of the video service capability of the IP network and the telephone network, and saves the communication cost.

BRIEF DESCRIPTION OF THE DRAWINGS

In order to describe the technical solutions of the embodiments of the present disclosure more clearly, accompanying drawings that need to be used for describing the embodiments are briefly described as follows. Apparently, the drawings in the following description represent only some examples described in the embodiments of the present disclosure. For one of ordinary skill in the art, other drawings can also be obtained according to these drawings.

DETAILED DESCRIPTION

In order to make one skilled in the art better understand the technical solutions in the embodiments of the present disclosure, the technical solutions in the embodiments of the present disclosure will be clearly and completely described below with reference to the accompanying drawings in the embodiments of the present disclosure. The described embodiments represent only some but not all of the embodiments of the present disclosure. All other embodiments obtained by one of ordinary skill in the art based on the examples in the embodiments of the present disclosure shall fall within the scope of protection of the embodiments of the present disclosure.

Specific implementations of the embodiments of the present disclosure are further described below with reference to the accompanying drawings of the embodiments of the present disclosure.

Figure 1:
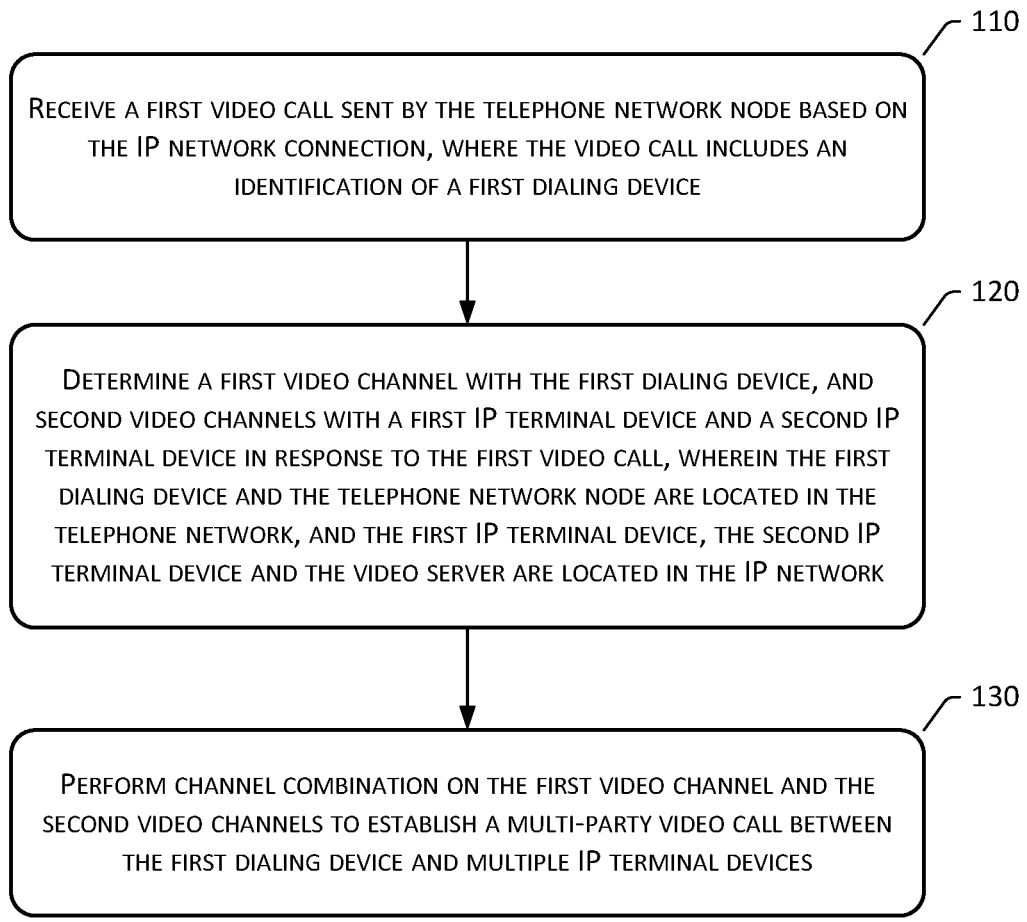
FIG. 1 is a schematic flowchart of a communication method according to an embodiment of the present disclosure.

FIG. 1 is a schematic flowchart of a communication method according to an embodiment of the present disclosure. The communication method of FIG. 1 is applied to a video server having an IP network connection with a telephone network node. It should be understood that the video server includes, but is not limited to, a server with video processing capability, a server cluster, a cloud server such as a dedicated cloud, a private cloud, and a public cloud, etc.

The method includes the following steps:

110: Receive a first video call sent by the telephone network node based on the IP network connection, the video call including an identification of a first dialing device.

It should be understood that the so-called telephone network of the telephone network node includes, but is not limited to, a public switched telephone network (PSTN), a public land mobile network (PLMN for short), etc. The telephone network node may include a gateway connecting the telephone network to the IP network. The Internet Protocol (IP) network is an Internet layer protocol in TCP/IP systems. Using an IP network can improve the scalability of the network. For example, the interconnection of large-scale and heterogeneous networks is realized, and the coupling relationship between top-level network applications and bottom-level network technologies is divided to facilitate independent developments of the two (top-level network applications and bottom-level network technologies). In other words, the telephone network may be a non-IP network.

It also should be understood that the telephone network node may be configured with an IP Multimedia Subsystem (IMS) to help establish a media channel that is capable of conducting video communication with the IP network. Messages (e.g., video calls, etc.) received by the telephone network node from a dialing device are in compliance with the communication protocol (e.g., statutory standard protocol or de facto standard protocol) of the telephone operator deploying the above-mentioned telephone network. Telephone operators provide IP network traffic services and IP video telephone services over the telephone network, wherein initiating a video call corresponds to an IP video telephone service.

It also should be understood that the dialing device may include a mobile phone, a landline phone, any electronic device configured with landline phone functions, and the like.

It also should be understood that receiving the first video call sent by the telephone network node based on the IP network connection may be receiving the first video call initiated by the first dialing device and forwarded by the telephone network node based on the IP network connection. In other words, the first dialing device sends the first video call to the telephone network node, and the telephone network node then forwards the first video call to the video server. When performing the above forwarding processing, the telephone network node can use an IMS system to change the communication protocol of the first video call from the communication protocol of the telephone network to the IP communication protocol, and send the video call based on the IP network.

120: Determine a first video channel with the first dialing device, and second video channels with a first IP terminal device and a second IP terminal device in response to the first video call, wherein the first dialing device and the telephone network node are located in the telephone network, and the first IP terminal device, the second IP terminal device and the video server are located in the IP network.

It should be understood that the video server, the first IP terminal device and the second IP terminal device are devices belonging to the same service architecture. For example, the video server can be used as a video processing device dedicated for the first IP terminal device and the second IP terminal device. In addition, the video server can also serve as a third-party video server other than the first IP terminal device and the second IP terminal device. Before the dialing device initiates a video call, at least one of the first IP terminal device and the second IP terminal device may have a connection with the video server based on the second video channel(s).

It also should be understood that determining the first video channel and the second video channels in response to the first video call may include the following implementations. In a first example, the first video channel may be established in response to the first video call, and the second video channels are determined, wherein the second video channels were established prior to receiving the first video call. In a second example, the first video channel and the second video channels may be established in response to the first video call.

It also should be understood that establishing at least one of the first video channel and the second video channels may be performed by adopting a Session Initiation Protocol (SIP). Other media channel establishing protocols may also be adopted, which are not limited by the embodiments of the present disclosure.

130: Perform channel combination on the first video channel and the second video channels to establish a multi-party video call between the first dialing device and multiple IP terminal devices.

It should understood that, for performing channel combination on the first video channel and the second video channels, data transmitted through the first video channel and data transmitted through the corresponding second video channels of the first IP terminal device and the second IP terminal device can be monitored. The data of these three video channels is processed and combined in real time, and then sent to the device corresponding to each video channel. It is also possible to establish a video channel between the dialing device and the first IP terminal device based on the first video channel and the second video channel of the first IP terminal device, and establish a video channel between the dialing device and the second IP terminal device based on the first video channel and the second video channel of the second IP terminal device. These two video channels may then be monitored for performing channel combination.

In the present disclosure, since the video server has an IP network connection with the telephone network node, a video channel with the dialing device located in the same telephone network of the telephone network node is realized, which realizes video data transmission between the IP network and the telephone network. In addition, since the respective video channels of multiple IP terminal devices can be configured in the IP network, a multi-party video call between the multiple IP terminal devices and the dialing device is realized, which improves the performance of the video service capabilities of the IP network and the telephone network, and saves the communication cost.

In other words, the communication between the dialing device and the telephone network node is based on a video telephone protocol (a protocol in 5G telephone network). The communication between the telephone network node and the video server is based on the IP network. The communication between the video server and the IP terminal device is based on the IP network. Specifically, the telephone network node receives a video call from the dialing device based on a video telephone protocol, and forwards the video call to the video server based on the IP network. In response to the video call, the video server sends a session request to the telephone network node based on the IP network. The telephone network node receives a session request based on the IP network and forwards the session request to the dialing device based on the video telephone protocol. In response to the session request, the dialing device sends a session confirmation to the telephone network node based on the video telephone protocol. The telephone network node forwards the session confirmation based on the IP network.

In some examples, the first video channel with the first dialing device may be established after the second video channels are established with the first IP terminal device and the second IP terminal device. It is also possible to establish the second video channels with the first IP terminal device and the second IP terminal device after the first video channel with the first dialing device is established.

In other examples, the second video channels with the first IP terminal device and the second IP terminal device can be established simultaneously in response to a video call request. It is also possible to establish a video call with the first IP terminal device, and then add the second IP terminal device to the video call. For example, when conducting a video call based on a first media channel of the first dialing device and a second media channel of the first IP terminal device, the method may further include: in response to the video call, notifying the first dialing device and the first IP terminal device that the second IP terminal device is about to join. For example, an identification of the second IP terminal device is sent to the first dialing device and the first IP terminal device, and respective local video processing modules of the first dialing device and the first IP terminal device can respond to the identification and adjust respective video windows, etc. In response to the identification, the first dialing device and the first IP terminal device can monitor respective local network environments, and send reports to the video server. The video server can send a session request to the second IP terminal device when both the first dialing device and the first IP terminal device satisfy conditions for a multi-party video call, to establish a second video channel with the second IP terminal device.

In other examples, the same communication method can also be used when the second dialing device joins the above-mentioned multi-party video call, which is not repeated in the examples of the present disclosure.

In implementations, determining the first video channel with the first dialing device in response to the first video call includes: sending a session request to the telephone network node based on the IP network connection in response to the first video call, the session request including an identification of the video server; and receiving a session confirmation sent by the telephone network node based on the IP network connection, and establishing the first video channel, wherein the session confirmation includes an identification of the first dialing device.

Since the first video channel is established through the session request in response to the first video call, establishing the first video channel is realized through fast and convenient interactions.

In implementations, performing the channel combination on the first video channel and the second video channel includes: obtaining video call data of the first dialing device, video call data of the first IP terminal device and the second IP terminal device based on the first video channel of the first dialing device and the second video channels of the first IP terminal device and the second IP terminal device respectively; generating real-time combined call data according to the video call data of the first dialing device, the first IP terminal device and the second IP terminal device; and sending the real-time combined call data to the first dialing device, the first IP terminal device and the second IP terminal device based on the first video channel of the first dialing device and the second video channels of the first IP terminal device and the second IP terminal device respectively.

Since the video data obtained from various video channels can be combined and processed to realize the integration of the various video channels, it is not necessary to improve the network architecture for the multi-party call, and still the multi-party video call can be realized.

In implementations, performing the channel combination on the first video channel and the second video channel includes: obtaining video call data of the first dialing device, video call data of the first IP terminal device and the second IP terminal device based on the first video channel of the first dialing device and the second video channels of the first IP terminal device and the second IP terminal device respectively; and recording the video call data of the first dialing device, the first IP terminal device and the second IP terminal device in real time as a target video file, and locally saving the target video file.

The solution of this example can record the video call data of the first dialing device, the first IP terminal device, and the second IP terminal device as a target video file in real time, and save the target video file locally, thus realizing recording services under video customer service scenarios, for example.

In implementations, determining the second video channels with the first IP terminal device and the second IP terminal device in response to the first video call includes: querying the current service status of each agent terminal device in the IP network in response to the first video call, the current service status indicating being currently available or currently occupied; and determining the first IP terminal device and the second IP terminal device from the agent terminal devices whose current service status indicates currently available.

Since the first IP terminal device and the second IP terminal device are currently available devices determined from various agent terminal devices, services under multi-agent customer service scenarios, for example, are implemented. For example, in a multi-agent customer service scenario, the first IP terminal device may be a technical service agent, and the second IP terminal device may be a customer service agent, thereby improving the service quality and efficiency of the customer service.

In implementations, the method further includes: using the web socket protocol to encapsulate a SIP session request; sending the SIP session request to respective browser clients installed on the first IP terminal device and the second IP terminal device via the IP network; and receiving session confirmations sent by the respective browser clients based on the web socket protocol via the IP network, and establishing the second video channels of the first IP terminal device and the second IP terminal device.

It should be understood that WebSocket is a protocol for full-duplex communication over a single TCP connection. Since SIP session requests and SIP session confirmations can reliably and efficiently establish video transmission channels in the IP network, and the web socket protocol is compatible with the software framework of browser clients, the second video channels are quickly established.

In implementations, the method further includes: obtaining a user inquiry of the first dialing device though the first video channel; identifying the user inquiry, and determining a customer service reply corresponding to the user inquiry;

and returning the customer service reply to the first dialing device though the first video channel.

Since the video server can identify user inquiries and combine video channels, both the video data processing efficiency and the data communication efficiency are taken into account.

In implementations, the method further includes: determining a third video channel with a second dialing device in response to a second video call, wherein the second dialing device and the telephone network node are located in the telephone network; and performing channel combination on the first video channel, the second video channel, and the third video channel, to add the second dialing device to the multi-party video call.

Since channel combination can be performed on the first video channel, the second video channel and the third video channel, adding a new communication device in the multi-party video communication is realized.

Figure 2A:
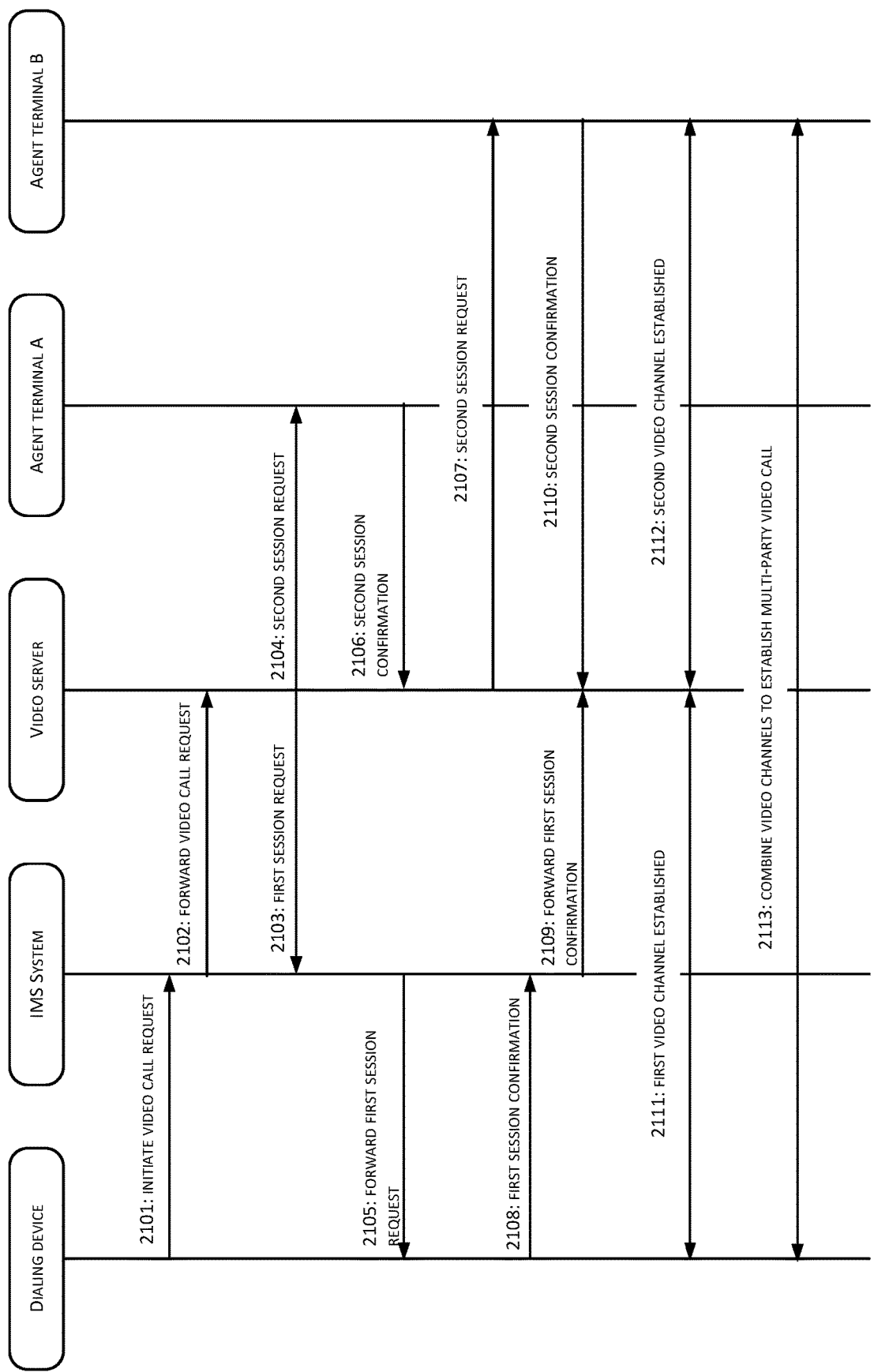
FIG. 2A is a schematic interaction diagram of a communication method according to another embodiment of the present disclosure.

FIG. 2A is a schematic interaction diagram of a communication method according to another embodiment of the present disclosure. The interaction diagram of this example involves an interaction process among a dialing device, a network node configured with an IMS telephone, a video server, an agent terminal A as a first IP terminal device, and an agent terminal B as a second IP terminal device.

It should be understood that the method of this example may include more or fewer steps, and may also include alternative steps, which is not limited in this example.

It also should be understood that the IMS-configured telephone network node may act as a telephone network gateway connected to the IP network. In other words, the dialing device (e.g., the first dialing device described above) may be located in a telephone network with the telephone network node. The telephone network node may be located in the IP network with the video server, the agent terminal A, and the agent terminal B. the telephone network node and the video server have an IP network connection, and the telephone network node has an IP network connection with at least one of the agent terminal A and the agent terminal B, or may have no IP network connection with both of them.

In step 2101, the dialing device initiates a video call to the telephone network node.

In step 2102, the telephone network node forwards the video call to the video server.

In step 2103, the video server sends a first session request to the telephone network node.

In step 2104, the video server sends a second session request to the agent terminal A.

In step 2105, the telephone network node forwards the first session request to the dialing device.

In step 2106, the agent terminal A sends a second session confirmation to the video server.

In step 2107, the video server sends a second session request to the agent terminal B.

In step 2108, the dialing device sends a first session confirmation to the telephone network node.

In step 2109, the telephone network node sends a first session confirmation to the video server. Specifically, the first session confirmation is a response to the first session request.

In step 2110, the agent terminal B sends a second session confirmation to the video server. Specifically, the second session confirmation is a response to the second session request.

In step 2111, a first video channel between the dialing device and the video server is established. Specifically, the first video channel may be established in response to receiving the first session confirmation.

In step 2112, respective second video channels of the video server with the agent terminal A and the agent terminal B are established. Specifically, the second video channels may be established in response to receiving the second session confirmations.

In step 2113, channel combination is performed on the first video channel and the second video channels to establish a multi-party video call. Specifically, after the video channel established later in time among the first video channel and the second video channels is established, the video server can monitor transmitted data in the first video channel and the second video channels, and generate real-time combined video data, such as encapsulating real-time combined video data into a sequence of packets using a specific data encapsulation format.

Figure 2B:
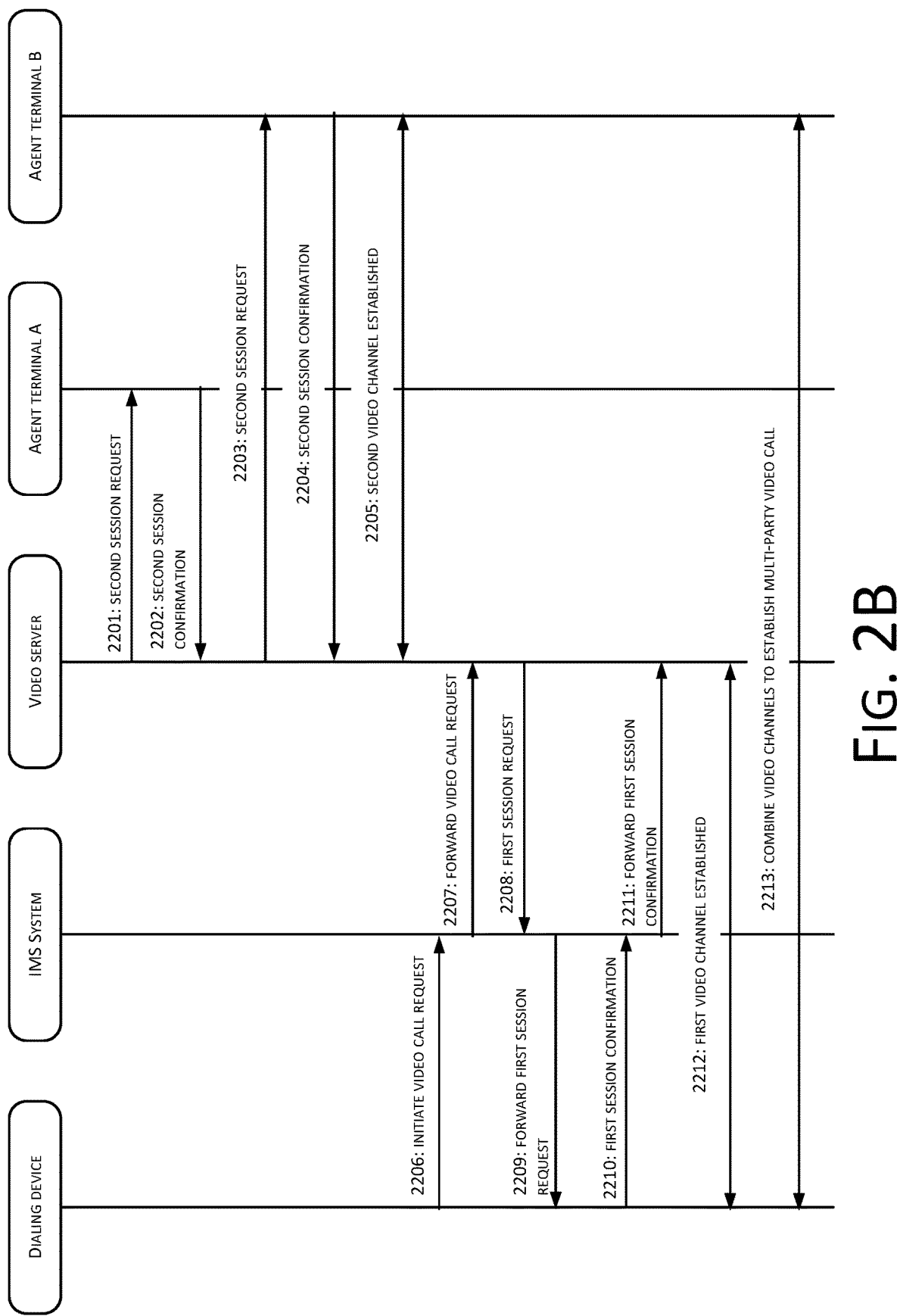
FIG. 2B is a schematic interaction diagram of a communication method according to another embodiment of the present disclosure.

FIG. 2B is a schematic interaction diagram of a communication method according to another embodiment of the present disclosure. The interaction diagram of this example involves an interaction process among a dialing device, a network node configured with an IMS telephone, a video server, an agent terminal A as a first IP terminal device, and an agent terminal B as a second IP terminal device.

It should be understood that the method of this example may include more or fewer steps, and may also include alternative steps, which is not limited in this example.

It also should be understood that the IMS-configured telephone network node may act as a telephone network gateway connected to an IP network. In other words, the dialing device (e.g., the first dialing device described above) may be located in a telephone network with the telephone network node. The telephone network node may be located in the IP network with the video server, the agent terminal A, and the agent terminal B. The telephone network node and the video server have an IP network connection, and the telephone network node has an IP network connection with at least one of the agent terminal A and the agent terminal B, or may have no IP network connection with both of them.

In the previous example, the first video channel and the second video channels are established at the same time. In response to a video call, a first session request is sent to the telephone network node. In response to the video call, second session request(s) is/are sent to at least one of the agent terminal A and the agent terminal B.

In this example, the second video channels are completed before the video call is initiated.

In step 2101, the telephone network node forwards the video call to the video server.

In step 2102, the agent terminal A sends a second session confirmation to the video server.

In step 2103, the video server sends a second session request to the agent terminal B.

In step 2114, the agent terminal B sends a second session confirmation to the video server.

In step 2115, respective second video channels of the video server with the agent terminal A and the agent terminal B are established.

In step 2106, the dialing device initiates a video call to the telephone network node.

In step 2107, the video server sends a first session request to the telephone network node.

In step 2108, the video server sends a second session request to the agent terminal A.

In step 2109, the telephone network node forwards the first session request to the dialing device.

In step 2110, the dialing device sends a first session confirmation to the telephone network node.

In step 2111, the telephone network node sends a first session confirmation to the video server.

In step 2112, a first video channel between the dialing device and the video server is established.

In step 2113, channel combination is performed on the first video channel and the second video channels to establish a multi-party video call.

Figure 3:
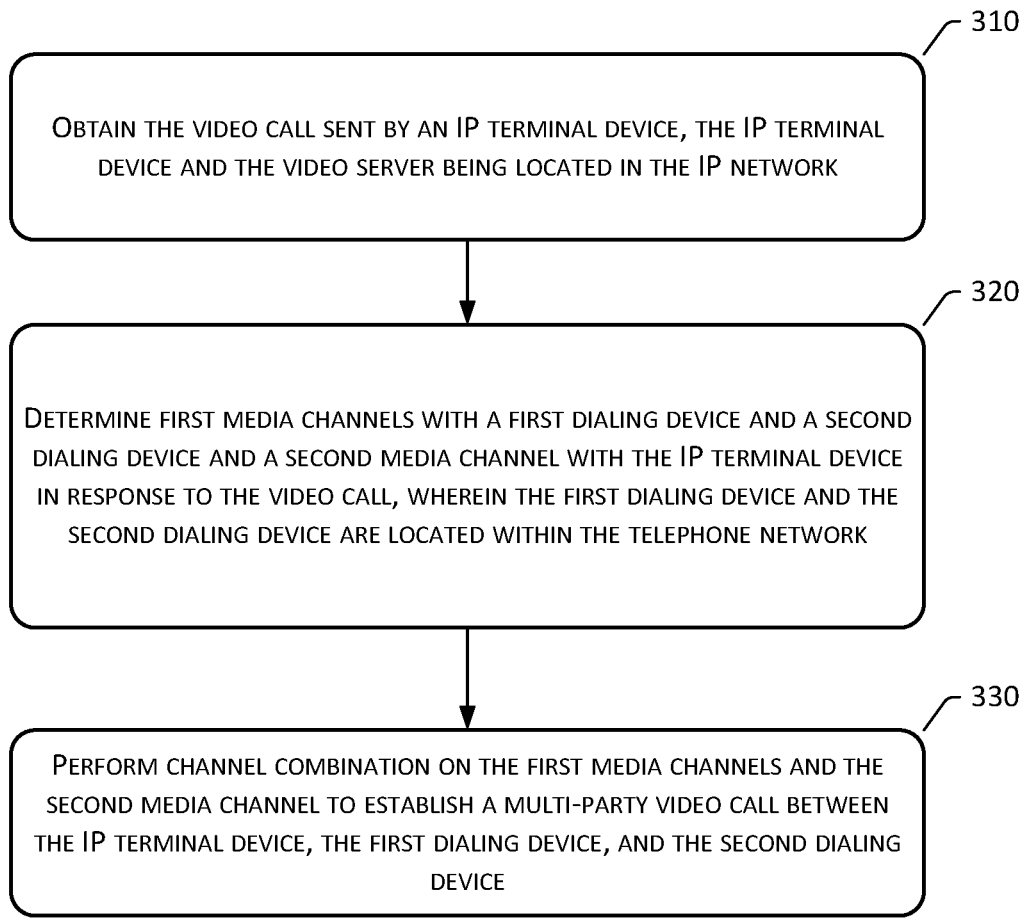
FIG. 3 is a schematic flowchart of a communication method according to another embodiment of the present disclosure.

FIG. 3 is a schematic flowchart of a communication method according to another embodiment of the present disclosure. The communication method of FIG. 3 is applied to a video server having an IP network connection with a telephone network node. It should be understood that the video server may include, but is not limited to, a server with video processing capability, a server cluster, a cloud server such as a dedicated cloud, a private cloud, and a public cloud, etc.

The method includes the following steps:

310: Obtain the video call sent by an IP terminal device, the IP terminal device and the video server being located in the IP network.

320: Determine first media channels with a first dialing device and a second dialing device and a second media channel with the IP terminal device in response to the video call, wherein the first dialing device and the second dialing device are located within the telephone network.

330: Perform channel combination on the first media channels and the second media channel to establish a multi-party video call between the IP terminal device, the first dialing device, and the second dialing device.

In the present disclosure, since the video server has an IP network connection with the telephone network node, a video channel with the dialing device located in the same telephone network of the telephone network node is realized, which realizes video data transmission between the IP network and the telephone network. In addition, since the respective video channels of multiple IP terminal devices can be configured in the IP network, a multi-party video call between the multiple IP terminal devices and the dialing device is realized, which improves the performance of the video service capabilities of the IP network and the telephone network, and saves the communication cost.

In other words, the communication between the dialing device and the telephone network node is based on a video telephone protocol (a protocol in 5G telephone network). The communication between the telephone network node and the video server is based on the IP network. The communication between the video server and the IP terminal device is based on the IP network. Specifically, the telephone network node receives a video call from the dialing device based on a video telephone protocol, and forwards the video call to the video server based on the IP network. In response to the video call, the video server sends a session request to the telephone network node based on the IP network. The telephone network node receives a session request based on the IP network and forwards the session request to the dialing device based on the video telephone protocol. In response to the session request, the dialing device sends a session confirmation to the telephone network node based on the video telephone protocol. The telephone network node forwards the session confirmation based on the IP network.

It should be understood that the IMS system in each embodiment of the present disclosure may be deployed in any network node of the 5G core network.

In some examples, first media channels with the first dialing device and the second dialing device are determined in response to a video call. The identification of the second dialing device is included in the video call, and the video server may have a first media channel with the first dialing device. According to the identification of the second dialing device, a first media channel between the video server and the second dialing device is established (e.g., a first video channel) to enable a multi-party video call. For example, when a video call is conducted based on the first media channel of the first dialing device and the second media channel, the method further includes: notifying the first dialing device and the IP terminal device that the second dialing device is about to join in response to the video call. For example, the identification of the second dialing device is sent to the first dialing device and the IP terminal device, and local video processing modules of the first dialing device and the IP terminal device can respond to the identification and adjust corresponding video windows. The first dialing device and the IP terminal device can monitor respective local network environments in response to the identification, and send reports to the video server. The video server can send a session request to the second dialing device when both the first dialing device and the first IP terminal device satisfy conditions for a multi-party video call.

In other examples, the video call includes respective identifications of the first dialing device and the second dialing device. The video server can establish first media channels with the first dialing device and the second dialing device to realize a multi-party video call based on the identifications of the first dialing device and the second dialing device.

In other examples, a second media channel with the IP terminal device is determined in response to the video call. A second media channel with the IP terminal device can be established in response to the video call.

Figure 4:
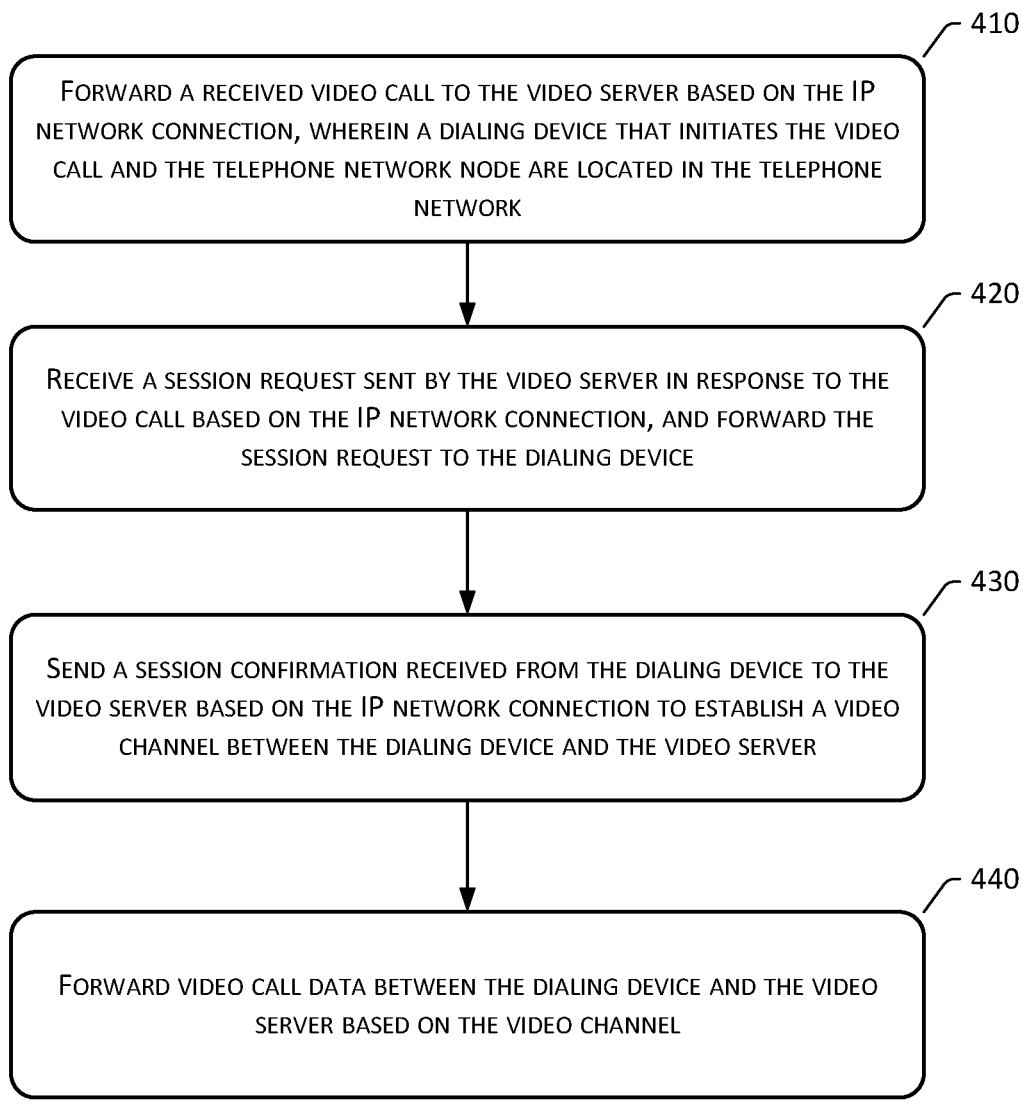
FIG. 4 is a schematic flowchart of a communication method according to another embodiment of the present disclosure.

FIG. 4 is a schematic flowchart of a communication method according to another embodiment of the present disclosure. The communication method of FIG. 4 is applied to a telephone network node having an IP network connection with a video server.

A telephone network node may be configured with an IP Multimedia Subsystem (IMS) to help establish a media channel capable of video communication with the IP network. Messages (e.g., video calls, etc.) received by the telephone network node from a dialing device are in compliance with the communication protocol (e.g., statutory standard protocol or de facto standard protocol) of the telephone operator deploying the telephone network. The telephone operator provides IP network traffic services and IP video telephone services over the telephone network. Initiating a video call corresponds to an IP video telephone service.

The method includes the following steps:

410: Forward a received video call to the video server based on the IP network connection, wherein a dialing device that initiates the video call and the telephone network node are located in the telephone network.

420: Receive a session request sent by the video server in response to the video call based on the IP network connection, and forward the session request to the dialing device.

430: Send a session confirmation received from the dialing device to the video server based on the IP network connection to establish a video channel between the dialing device and the video server.

440: Forward video call data between the dialing device and the video server based on the video channel.

In the present disclosure, since the video server has an IP network connection with the telephone network node, a video channel with the dialing device located in the same telephone network of the telephone network node is realized, which realizes video data transmission between the IP network and the telephone network. In addition, since the respective video channels of multiple IP terminal devices can be configured in the IP network, a multi-party video call between the multiple IP terminal devices and the dialing device is realized, which improves the performance of the video service capabilities of the IP network and the telephone network, and saves the communication cost.

Figure 5:
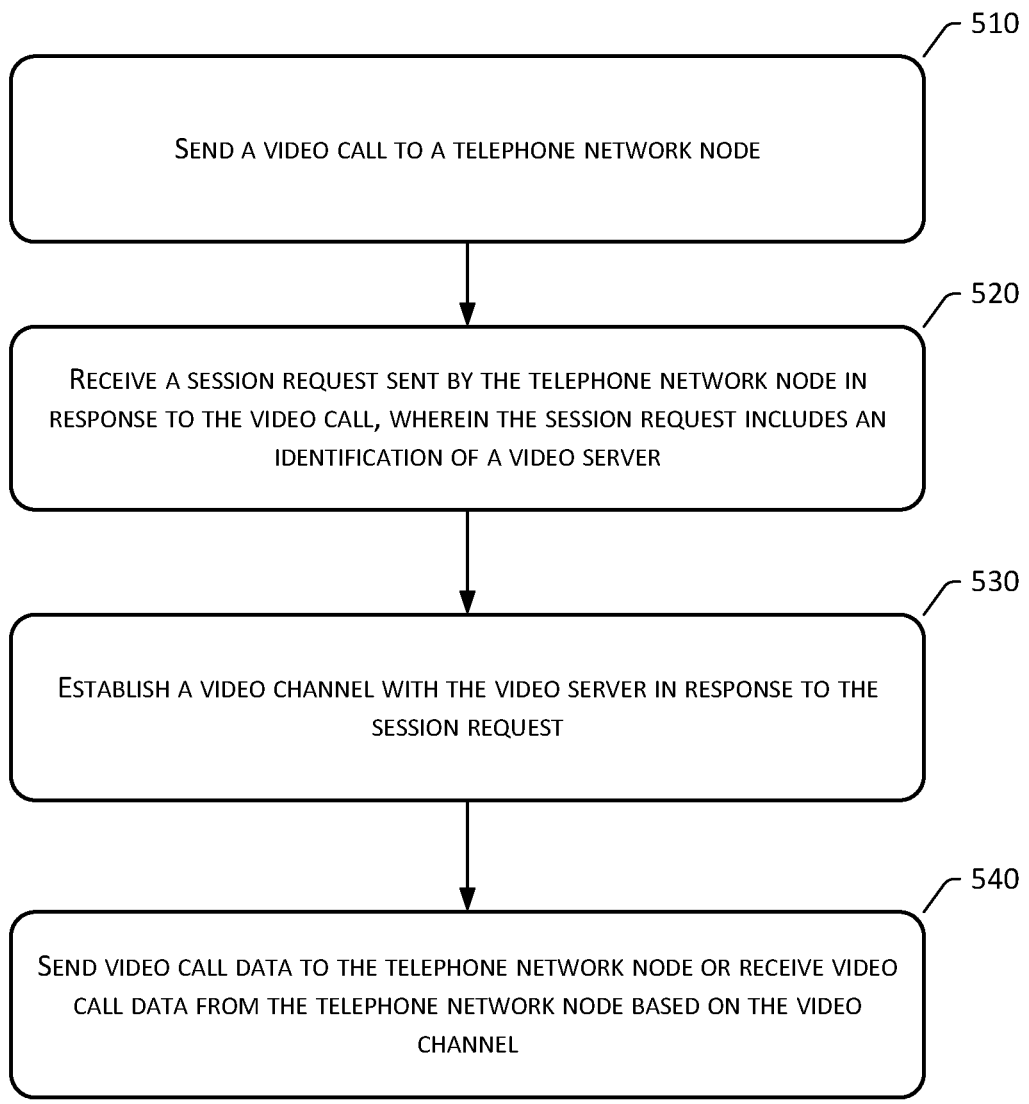
FIG. 5 is a schematic flowchart of a communication method according to another embodiment of the present disclosure.

FIG. 5 is a schematic flowchart of a communication method according to another embodiment of the present disclosure. The communication method of FIG. 5 is applied to a dialing device, and includes the following steps:

510: Send a video call to a telephone network node.

520: Receive a session request sent by the telephone network node in response to the video call, wherein the session request includes an identification of a video server.

530: Establish a video channel with the video server in response to the session request.

540: Send video call data to the telephone network node or receive video call data from the telephone network node based on the video channel.

In the present disclosure, since the video server has an IP network connection with the telephone network node, a video channel with the dialing device located in the same telephone network of the telephone network node is realized, which realizes video data transmission between the IP network and the telephone network. In addition, since the respective video channels of multiple IP terminal devices can be configured in the IP network, a multi-party video call between the multiple IP terminal devices and the dialing device is realized, which improves the performance of the video service capabilities of the IP network and the telephone network, and saves the communication cost.

Apparatuses corresponding to the above method embodiments will be described below with reference to various embodiments of FIGS. 6-9.

Figure 6:
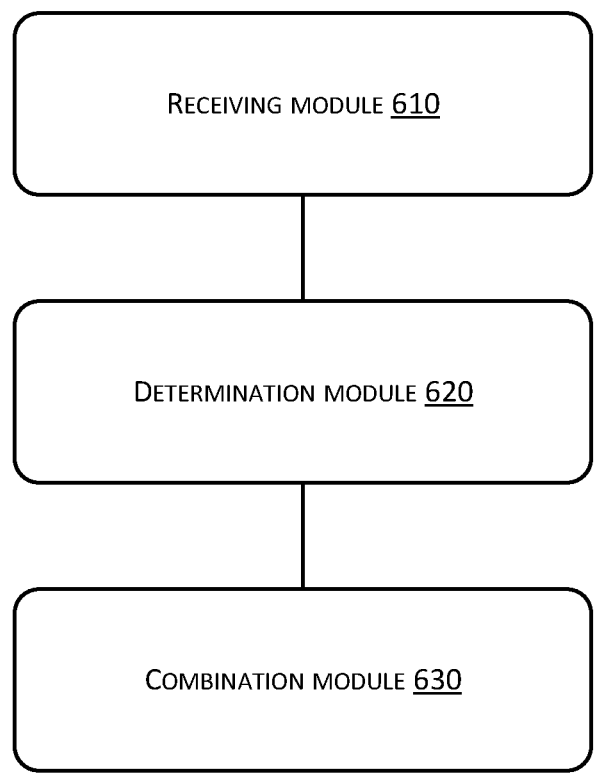
FIG. 6 is a schematic block diagram of a communication apparatus according to another embodiment of the present disclosure.

FIG. 6 is a schematic block diagram of a communication apparatus according to another embodiment of the present disclosure. The communication apparatus in FIG. 6 is applied to a video server that has an IP network connection with a telephone network node. The apparatus includes:

a receiving module 610 that receives a first video call sent by a telephone network node based on an IP network connection, the video call including an identification of a first dialing device;

a determination module 620 that determines a first video channel with the first dialing device and second video channels with a first IP terminal device and a second IP terminal device in response to the first video call, wherein the first dialing device and the telephone network node are located in a telephone network, and the first IP terminal device, the second IP terminal device and the video server are located in an IP network; and a combination module 630 that performs channel combination on the first video channel and the second video channel to establish a multi-party video call between the first dialing device and multiple IP terminal devices.

In the present disclosure, since the video server has an IP network connection with the telephone network node, a video channel with the dialing device located in the same telephone network of the telephone network node is realized, which realizes video data transmission between the IP network and the telephone network. In addition, since the respective video channels of multiple IP terminal devices can be configured in the IP network, a multi-party video call between the multiple IP terminal devices and the dialing device is realized, which improves the performance of the video service capabilities of the IP network and the telephone network, and saves the communication cost.

In implementations, the determination module is specifically configured to: send a session request to the telephone network node based on the IP network connection in response to the first video call, the session request including an identification of the video server; and receiving a session confirmation based on the IP network connection and establishing the first video channel, wherein the session confirmation includes an identification of the first dialing device.

In implementations, the combination module is specifically configured to obtain video call data of the first dialing device and video call data of the first IP terminal device and the second IP terminal device based on the first video channel of the first dialing device and the second video channels of the first IP terminal device and the second IP terminal device respectively; generate real-time combined call data according to the video call data of the first dialing device, the first IP terminal device and the second IP terminal device; and send the real-time combined call data to the first dialing device, the first IP terminal device, and the second IP terminal device based on the first video channel of the first dialing device and the second video channels of the first IP terminal device and the second IP terminal device respectively.

In implementations, the combination module is specifically configured to obtain video call data of the first dialing device and video call data of the first IP terminal device and the second IP terminal device based on the first video channel of the first dialing device and the second video channels of the first IP terminal device and the second IP terminal device respectively; and record the video call data of the first dialing device, the first IP terminal device and the second IP terminal device as a target video file in real time, and locally store the target video file.

In implementations, the determination module is specifically configured to: query a current service status of each agent terminal device in the IP network in response to the first video call, the current service status indicating being currently available or currently occupied; and determine the first IP terminal device and the second IP terminal device from among agent terminal devices whose status indicates being currently available.

In implementations, the apparatus further includes: a request encapsulation module that encapsulates a SIP session request using a web socket protocol; a request sending module that sends the SIP session request to respective installed browser clients of the first IP terminal device and the second IP terminal devices; a channel establishing module that receives session confirmations sent by the respective browser clients based on the web socket protocol within the IP network, and establishes the second video channels with the first IP terminal device and the second IP terminal device.

In implementations, the apparatus further includes: an inquiry acquisition module that obtains a user inquiry of the first dialing device through the first video channel; an identification module that identifies the user inquiry, and determines a customer service reply corresponding to the user inquiry; and a reply returning module that returns the customer service reply to the first dialing device through the first video channel.

In implementations, the apparatus further includes: a channel determination module that determines a third video channel with a second dialing device in response to a second video call, wherein the second dialing device and the telephone network node are located within the telephone network; and the combination module is further configured to perform channel combination on the first video channel, the second video channel and the third video channel to add the second dialing device to the multi-party video call.

The apparatus of this embodiment is used to implement corresponding methods in the foregoing method embodiments, and has the beneficial effects of the corresponding method embodiments, which will not be repeated herein. In addition, for the functional implementations of each module in the apparatus of this embodiment, reference may be made to the description of the corresponding parts in the foregoing method embodiments, and details thereof are not repeated herein.

Figure 7:
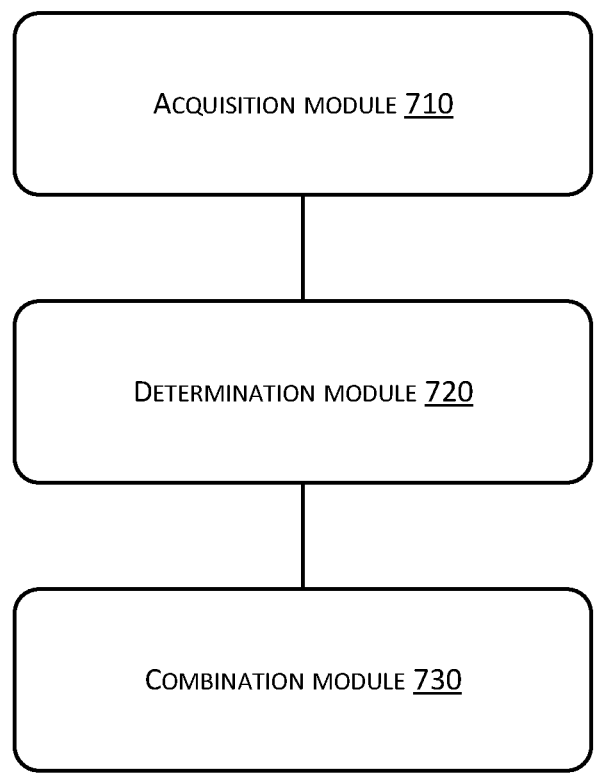
FIG. 7 is a schematic block diagram of a communication apparatus according to another embodiment of the present disclosure.

FIG. 7 is a schematic block diagram of a communication apparatus according to another embodiment of the present disclosure. The communication apparatus of FIG. 7 is applied to a video server having an IP network connection with a telephone network node, and the apparatus includes:

an acquisition module 710 that obtains a video call sent by an IP terminal device, the IP terminal device and the video server being located in an IP network;

a determination module 720 that determines first media channels with a first dialing device and a second dialing device and a second media channel with the IP terminal device in response to the video call, wherein the first dialing device and the second dialing device are located within a telephone network; and a combination module 730 that performs channel combination on the first media channel and the second media channels to establish a multi-party video call among the IP terminal device, the first dialing device and the second dialing device.

In the present disclosure, since the video server has an IP network connection with the telephone network node, a video channel with the dialing device located in the same telephone network of the telephone network node is realized, which realizes video data transmission between the IP network and the telephone network. In addition, since the respective video channels of multiple IP terminal devices can be configured in the IP network, a multi-party video call between the multiple IP terminal devices and the dialing device is realized, which improves the performance of the video service capabilities of the IP network and the telephone network, and saves the communication cost.

The apparatus of this embodiment is used to implement corresponding methods in the foregoing method embodiments, and has the beneficial effects of the corresponding method embodiments, which will not be repeated herein. In addition, for the functional implementations of each module in the apparatus of this embodiment, reference may be made to the description of the corresponding parts in the foregoing method embodiments, and details thereof are not repeated herein.

Figure 8:
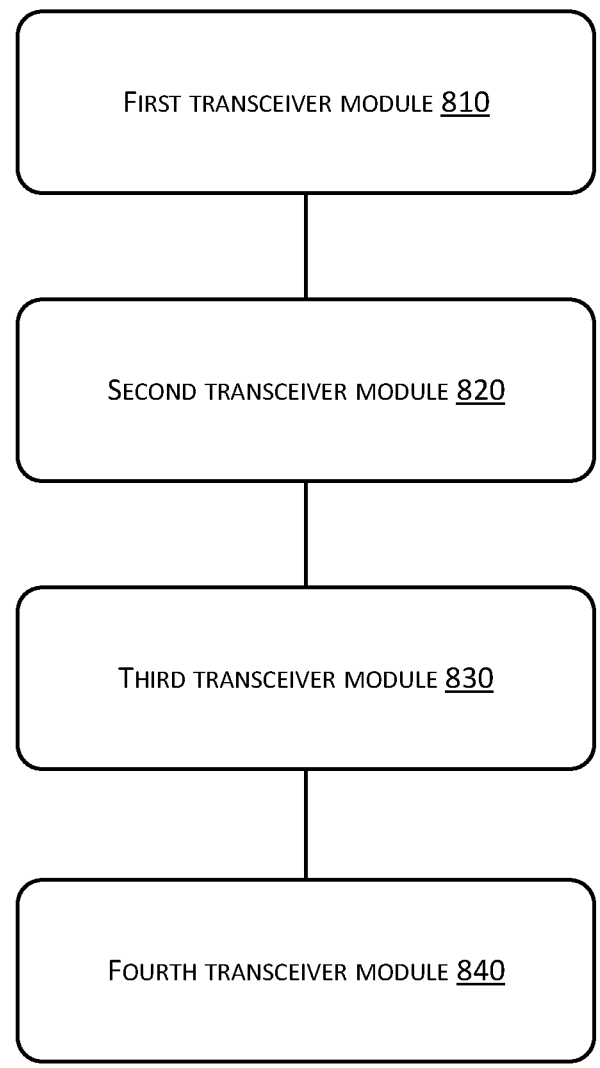
FIG. 8 is a schematic block diagram of a communication apparatus according to another embodiment of the present disclosure.

FIG. 8 is a schematic block diagram of a communication apparatus according to another embodiment of the present disclosure. The communication apparatus of FIG. 8 is applied to a telephone network node having an IP network connection with a video server, and the apparatus includes:

a first transceiver module 810 that forwards a received video call to the video server based on the IP network connection, wherein a dialing device that initiates the video call and the telephone network node are located in a telephone network;

a second transceiver module 820 that receives a session request sent by the video server in response to the video call based on the IP network connection, and forwards the session request to the dialing device;

a third transceiver module 830 that sends the session confirmation received from the dialing device to the video server based on the IP network connection to establish a video channel between the dialing device and the video server; and a fourth transceiver module 840 that forwards video call data between the dialing device and the video server based on the video channel.

In the present disclosure, since the video server has an IP network connection with the telephone network node, a video channel with the dialing device located in the same telephone network of the telephone network node is realized, which realizes video data transmission between the IP network and the telephone network. In addition, since the respective video channels of multiple IP terminal devices can be configured in the IP network, a multi-party video call between the multiple IP terminal devices and the dialing device is realized, which improves the performance of the video service capabilities of the IP network and the telephone network, and saves the communication cost.

The apparatus of this embodiment is used to implement corresponding methods in the foregoing method embodiments, and has the beneficial effects of the corresponding method embodiments, which will not be repeated herein. In addition, for the functional implementations of each module in the apparatus of this embodiment, reference may be made to the description of the corresponding parts in the foregoing method embodiments, and details thereof are not repeated herein.

Figure 9:
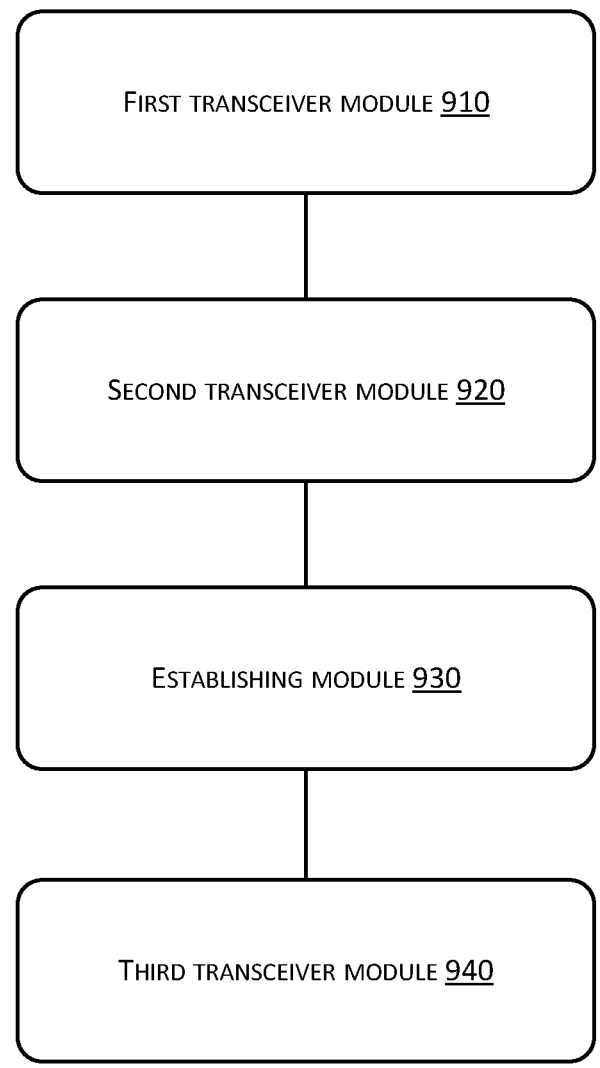
FIG. 9 is a schematic block diagram of a communication apparatus according to another embodiment of the present disclosure.

FIG. 9 is a schematic block diagram of a communication apparatus according to another embodiment of the present disclosure. The communication apparatus of FIG. 9 is applied to dialing device, and the apparatus includes:

a first transceiver module 910 that sends a video call to a telephone network node;

a second transceiver module 920 that receives a session request sent by the telephone network node in response to the video call, wherein the session request includes an identification of a video server;

an establishing module 930 that establishes a video channel with the video server in response to the session request; and a third transceiver module 940 that sends the video call data to the telephone network node or receives video call data from the telephone network node based on the video channel.

In the present disclosure, since the video server has an IP network connection with the telephone network node, a video channel with the dialing device located in the same telephone network of the telephone network node is realized, which realizes video data transmission between the IP network and the telephone network. In addition, since the respective video channels of multiple IP terminal devices can be configured in the IP network, a multi-party video call between the multiple IP terminal devices and the dialing device is realized, which improves the performance of the video service capabilities of the IP network and the telephone network, and saves the communication cost.

The apparatus of this embodiment is used to implement corresponding methods in the foregoing method embodiments, and has the beneficial effects of the corresponding method embodiments, which will not be repeated herein. In addition, for the functional implementations of each module in the apparatus of this embodiment, reference may be made to the description of the corresponding parts in the foregoing method embodiments, and details thereof are not repeated herein.

Figure 10:
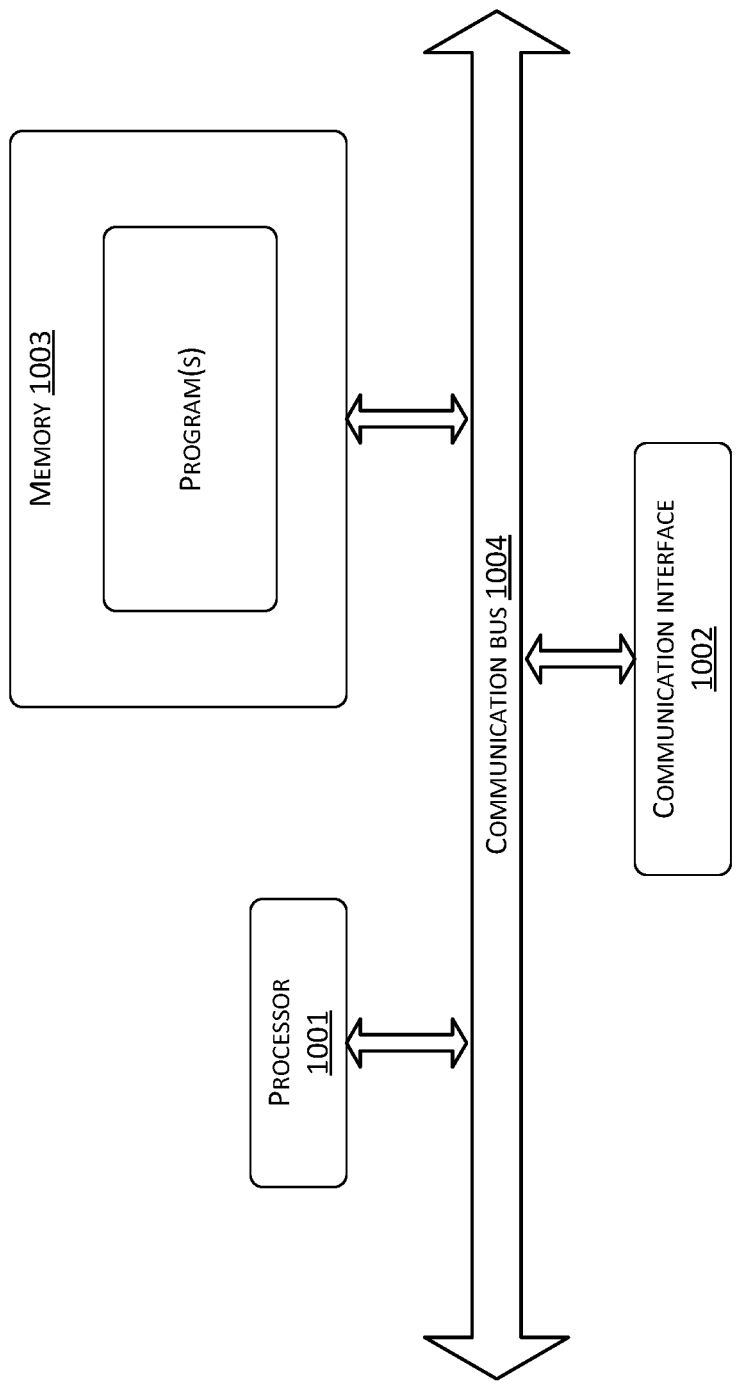
FIG. 10 is a hardware structure of an electronic device according to another embodiment of the present disclosure.

FIG. 10 is a hardware structure of an electronic device according to another embodiment of the present disclosure. In implementations, the apparatuses, the video server, the telephone network node, the IP terminal devices (such as the first IP terminal device, the second IP terminal device, etc.), the dialing devices (such as the first dialing device, the second dialing device, etc.) as described in the foregoing description may each include one or more electronic devices. As shown in FIG. 10, the hardware structure of the electronic device may include: a processor 1001, a communication interface 1002, a memory 1003, and a communication bus 1004.

The processor 1001, the communication interface 1002, and the memory 1003 communicate with each other through the communication bus 1004.

Optionally, the communication interface 1002 may be an interface of a communication module.

The processor 1001 may be specifically configured to: receive a first video call sent by a telephone network node based on an IP network connection, wherein the video call includes an identification of a first dialing device; determine a first video channel with the first dialing device and second video channels with a first IP terminal device and a second IP terminal device in response to the first video call, wherein the first dialing device and the telephone network node are located in a telephone network, and the first IP terminal device, the second IP terminal device and the video server are located in an IP network; and perform channel combination on the first video channel and the second video channels to establish a multi-party video call between the first dialing device and multiple IP terminal devices.

Alternatively, the processor 1001 may be specifically configured to: obtain a video call sent by an IP terminal device, wherein the IP terminal device and a video server are located in an IP network; determine first media channels with a first dialing device and a second dialing device in response to the video call, and a second media channel with the IP terminal device, wherein the first dialing device and the second dialing device are located in a telephone network; perform channel combination on the first media channels and the second media channel to establish a multi-party video call among the IP terminal device, the first dialing device and the second dialing device.

Alternatively, the processor 1001 may be specifically configured to: forward a received video call to a video server based on an IP network connection, wherein a dialing device that initiates the video call and a telephone network node are located in a telephone network; receiving a session request sent by the video server based on the IP network connection in response to the video call, and forward the session request to the dialing device; send a session confirmation received from the dialing device to the video server based on the IP network connection to establish a video channel between the dialing device and the video server; and forward video call data between the dialing device and the video server based on the video channel.

Alternatively, the processor 1001 may be specifically configured to: send a video call to a telephone network node; receive a session request sent by the telephone network node in response to the video call, wherein the session request includes an identification of a video server; and send video call data to the telephone network node or receive video call data from the telephone network node based on the video channel.

The above-mentioned processor may be a general-purpose processor, which includes a central processing unit (abbreviated as CPU), a network processor (abbreviated as NP), etc.; and may also be a digital signal processor (DSP), an application-specific integrated circuit (ASIC), field programmable gate array (FPGA) or other programmable logic devices, discrete gates or transistor logic devices, discrete hardware components. The methods, steps, and logical block diagrams disclosed in the embodiments of the present disclosure can be implemented or executed. A general purpose processor may be a microprocessor or the processor may be any conventional processor or the like.

The above-mentioned memory may be, but is not limited to, random access memory (RAM), read only memory (ROM), programmable read-only memory (PROM), erasable programmable read-only memory (EPROM), electrical erasable programmable read-only memory (EEPROM), etc. In implementations, the memory may include one or more program modules of the apparatuses as described in the foregoing description.

In particular, according to the embodiments of the present disclosure, the processes described above with reference to the flowcharts may be implemented as computer software programs. For example, the embodiments of the present disclosure include a computer program product, which includes a computer program carried on a storage medium. The computer program includes program codes configured to perform the methods shown in the flowcharts. In these embodiments, the computer program may be downloaded and installed from a network via a communication component, and/or installed from a removable medium. When this computer program is executed by a central processing unit (CPU), the above-mentioned functions defined in the methods of the present disclosure are performed. It should be noted that the storage medium described in the present disclosure may be a computer readable signal medium or a computer readable storage medium, or any combination thereof. The storage medium may be, for example, but not limited to, an electrical, magnetic, optical, electromagnetic, infrared, or semiconductor system, apparatus or device, or a combination of any of the above. More specific examples of computer readable storage media may include, but are not limited to, electrical connections with one or more wires, portable computer disks, hard disks, random access memory (RAM), read only memory (ROM), erasable programmable read-only memory (EPROM or flash memory), optical fibers, portable compact disk read only memory (CD-ROM), optical storage media devices, magnetic storage media devices, or any suitable combination of the above. In the present disclosure, a computer readable storage medium may be any tangible medium that includes or stores a program that can be used by or used in conjunction with an instruction execution system, apparatus, or device. As defined herein, the computer readable storage medium does not include transitory media, such as modulated data signals and carrier waves.

In the present disclosure, however, a computer readable signal medium may include a data signal propagated in baseband or as a part of a carrier wave, which carries computer readable program codes therein. Such propagated data signal may take a variety of forms, which include, but are not limited to electromagnetic signals, optical signals, or any suitable combination of the above. A computer readable signal medium can also be any storage medium other than a computer readable storage medium. Such storage medium can transmit, propagate, or transport a program that can be used by or used in conjunction with an instruction execution system, apparatus, or device. Program codes embodied on the storage medium may be transmitted using any suitable medium including, but not limited to, wireless, electrical wires, optical fiber cables, RF, etc., or any suitable combination of the above.

Computer program codes configured to perform operations of the present disclosure may be written in one or more programming languages, which include object-oriented programming languages—such as Java, Smalltalk, C++, but also conventional procedural programming languages—such as "C" language or similar programming languages. The program codes may execute entirely on a user's computer, or partly on the user's computer, or as a stand-alone software package, partly on the user's computer and partly on a remote computer, or entirely on the remote computer or server. When a remote computer is involved, the remote computer may be connected to the user's computer through any kind of network, which includes a local area network (LAN) or a wide area network (WAN), or may be connected to an external computer (e.g., using an Internet service provider to connect through the Internet).

The flowcharts and block diagrams in the accompanying drawings illustrate the architectures, functionalities, and operations of possible implementations of systems, methods and computer program products according to various embodiments of the present disclosure. In this regard, each block in a flowchart or block diagram may represent a module, a segment, or a portion of code that includes one or more executable instructions configured to implement specified logical functions. There are specific ordering relationships in the above specific embodiments, but these ordering relationships are only exemplary. When being implemented in practice, these steps may be fewer, more, or an order of execution may be adjusted. In other words, in some alternative implementations, the functions noted in the blocks may occur out of order as indicated in the associated figure. For example, two successive shown blocks may, in practice, be executed substantially concurrently, or the blocks may sometimes be executed in a reverse order, depending on the functionalities that are involved. It is also noted that each block of a block diagram and/or flowchart, and a combination of blocks in the block diagram and/or flowchart, may be implemented in a dedicated hardware-based system that performs specified functions or operations, or can be implemented in a combination of dedicated hardware and computer instructions.

The modules involved in the embodiments of the present disclosure may be implemented in the form of software, and may also be implemented in the form of hardware. Under certain conditions, the names of these modules in no way impose any limitation on the modules.

As another aspect, the present disclosure also provides a storage medium on which a computer program is stored. When the program is executed by a processor, the method(s) described in the above embodiments is/are implemented.

As another aspect, the present disclosure also provides a storage medium, which may be included in the apparatus that is described in the above embodiments, or may exist alone without being assembled into that apparatus. The storage medium carries one or more programs. When being executed by the apparatus, the one or more programs cause the apparatus to implement the methods of the above-mentioned embodiments.

The expressions "first," "second," "the first," or "the second," as used in various embodiments of the present disclosure, may modify various elements regardless of order and/or importance, but these expressions do not limit the corresponding parts. The above expressions are only used for the purpose of distinguishing an element from other elements. For example, a first user device and a second user device represent different user devices, though both are user devices. For example, a first element could be called as a second element, and, similarly, a second element could be called as a first element, without departing from the scope of the present disclosure.

When an element (e.g., a first element) is referred to as being "(operatively or communicatively) coupled with" another element (e.g., a second element) or "(operatively or communicatively) coupled to" another element (e.g., a second element), or "connected to" another element (e.g., a second element), it should be understood that such element is directly connected to the other element or such element is indirectly connected to the other element through yet another element (e.g., a third element). In contrast, it can be understood that when an element (e.g., a first element) is referred to as being "directly connected" or "directly coupled" to another element (e.g., a second element), no element (e.g., a third element) is interposed between the two.

The above merely describes exemplary embodiments of the present disclosure and an illustration of the technical principles that are applied. It should be understood by one skilled in the art that the inventive scope involved in the present disclosure is not limited to the technical solutions formed by the specific combinations of the above technical features, and shall also cover the above technical features or other technical solutions formed by any combination of their equivalent features, without departing from the above inventive concept. For example, a technical solution is formed by replacing the above-mentioned features with (but not limited to) technical features having functions similar to what are disclosed in the present disclosure.

What is claimed is:

1. A method implemented by a video server, the method comprising:
   receiving a first video call sent by a telephone network node based on an Internet Protocol (IP) network connection with the video server, the first video call including an identification of a first dialing device;
   determining a first video channel with the first dialing device, and second video channels with a first IP terminal device and a second IP terminal device in response to the first video call, wherein the first dialing device and the telephone network node are located in a telephone network, and the first IP terminal device, the second IP terminal device and the video server are located in an IP network, wherein determining the second video channels with the first IP terminal device and the second IP terminal device in response to the first video call comprises:
      querying a current service status of each agent terminal device in the IP network in response to the first video call, wherein the current service status indicates being currently available or currently occupied; and
      determining the first IP terminal device and the second IP terminal device from among agent terminal devices whose current service status indicates being currently available; and
   performing channel combination on the first video channel and the second video channels to establish a multi-party video call between the first dialing device and multiple IP terminal devices.

2. The method according to claim 1, wherein determining the first video channel with the first dialing device in response to the first video call comprises:
sending a session request to the telephone network node based on the IP network connection in response to the first video call, where the session request including an identification of the video server; and
receiving a session confirmation sent by the telephone network node based on the IP network connection, and establishing the first video channel, wherein the session confirmation includes the identification of the first dialing device.

3. The method according to claim 2, wherein performing the channel combination on the first video channel and the second video channels comprises:
obtaining video call data of the first dialing device and video call data of the first IP terminal device and the second IP terminal device based on the first video channel of the first dialing device and the second video channels of the first IP terminal device and the second IP terminal device respectively;
generating real-time combined call data according to the video call data of the first dialing device, the first IP terminal device and the second IP terminal device; and
sending the real-time combined call data to the first dialing device, the first IP terminal device and the second IP terminal device based on the first video channel of the first dialing device and the second video channels of the first IP terminal device and the second IP terminal device respectively.

4. The method according to claim 2, wherein performing the channel combination on the first video channel and the second video channels comprises:
obtaining video call data of the first dialing device and video call data of the first IP terminal device and the second IP terminal device based on the first video channel of the first dialing device and the second video channels of the first IP terminal device and the second IP terminal device respectively; and
recording the video call data of the first dialing device, the first IP terminal device and the second IP terminal device in real time as a target video file, and locally storing the target video file.

5. The method according to claim 1, further comprising:
encapsulating a SIP session request using a web socket protocol;
sending the SIP session request to respective browser clients installed on the first IP terminal device and the second IP terminal device within the IP network; and
receiving session confirmations sent by the respective browser clients based on the web socket protocol within the IP network, and establishing the second video channels with the first IP terminal device and the second IP terminal device.

6. The method according to claim 1, further comprising:
obtaining a user inquiry of the first dialing device through the first video channel;
identifying the user inquiry, and determining a customer service response corresponding to the user inquiry;
returning the customer service response to the first dialing device through the first video channel.

7. The method according to claim 1, further comprising:
determining a third video channel with a second dialing device in response to a second video call, wherein the second dialing device and the telephone network node are located within the telephone network; and
performing the channel combination on the first video channel, the second video channels and the third video channel to add the second dialing device to the multi-party video call.

8. One or more computer readable storage media storing executable instructions that, when executed by one or more processors of a video server, cause the one or more processors to perform acts comprising:
receiving a first video call sent by a telephone network node based on an Internet Protocol (IP) network connection with the video server, the first video call including an identification of a first dialing device;
determining a first video channel with the first dialing device, and second video channels with a first IP terminal device and a second IP terminal device in response to the first video call, wherein the first dialing device and the telephone network node are located in a telephone network, and the first IP terminal device, the second IP terminal device and the video server are located in an IP network;
performing channel combination on the first video channel and the second video channels to establish a multi-party video call between the first dialing device and multiple IP terminal devices;
encapsulating a SIP session request using a web socket protocol;
sending the SIP session request to respectively browser clients installed on the first IP terminal device and the second IP terminal device within the IP network; and
receiving session confirmations sent by the respective browser clients based on the web socket protocol within the IP network, and establishing the second video channels with the first IP terminal device and the second IP terminal device.

9. The one or more computer readable storage media according to claim 8, wherein determining the first video channel with the first dialing device in response to the first video call comprises:
sending a session request to the telephone network node based on the IP network connection in response to the first video call, where the session request including an identification of the video server; and
receiving a session confirmation sent by the telephone network node based on the ewIP network connection, and establishing the first video channel, wherein the session confirmation includes the identification of the first dialing device.

10. The one or more computer readable storage media according to claim 9, wherein performing the channel combination on the first video channel and the second video channels comprises:
separately obtaining video call data of the first dialing device and video call data of the first IP terminal device and the second IP terminal device based on the first video channel of the first dialing device and the second video channels of the first IP terminal device and the second IP terminal device;
generating real-time combined call data according to the video call data of the first dialing device, the first IP terminal device and the second IP terminal device; and
separately sending the real-time combined call data to the first dialing device, the first IP terminal device and the second IP terminal device based on the first video channel of the first dialing device and the second video channels of the first IP terminal device and the second IP terminal device.

11. The one or more computer readable storage media according to claim 9, wherein performing the channel combination on the first video channel and the second video channels comprises:
separately obtaining video call data of the first dialing device and video call data of the first IP terminal device and the second IP terminal device based on the first video channel of the first dialing device and the second video channels of the first IP terminal device and the second IP terminal device; and
recording the video call data of the first dialing device, the first IP terminal device and the second IP terminal device in real time as a target video file, and locally storing the target video file.

12. The one or more computer readable storage media according to claim 8, wherein determining the second video channels with the first IP terminal device and the second IP terminal device in response to the first video call comprises:
querying a current service status of each agent terminal device in the IP network in response to the first video call, wherein the current service status indicates being currently available or currently occupied; and
determining the first IP terminal device and the second IP terminal device from among agent terminal devices whose current service status indicates being currently available.

13. The one or more computer readable storage media according to claim 8, the acts further comprising:
obtaining a user inquiry of the first dialing device through the first video channel;
identifying the user inquiry, and determining a customer service response corresponding to the user inquiry;
returning the customer service response to the first dialing device through the first video channel.

14. The one or more computer readable storage media according to claim 8, the acts further comprising:
determining a third video channel with a second dialing device in response to a second video call, wherein the second dialing device and the telephone network node are located within the telephone network; and
performing the channel combination on the first video channel, the second video channels and the third video channel to add the second dialing device to the multi-party video call.

15. A video server comprising:
one or more processors;
memory storing executable instructions that, when executed by the one or more processors, cause the one or more processors to perform acts comprising:
receiving a first video call sent by a telephone network node based on an Internet Protocol (IP) network connection with the video server, the first video call including an identification of a first dialing device;
determining a first video channel with the first dialing device, and second video channels with a first IP terminal device and a second IP terminal device in response to the first video call, wherein the first dialing device and the telephone network node are located in a telephone network, and the first IP terminal device, the second IP terminal device and the video server are located in an IP network, wherein determining the second video channels with the first IP terminal device and the second IP terminal device in response to the first video call comprises:
querying a current service status of each agent terminal device in the IP network in response to the first video call, wherein the current service status indicates being currently available or currently occupied; and
determining the first IP terminal device and the second IP terminal device from among agent terminal devices whose current service status indicates being currently available; and
performing channel combination on the first video channel and the second video channels to establish a multi-party video call between the first dialing device and multiple IP terminal devices.

16. The video server according to claim 15, wherein determining the first video channel with the first dialing device in response to the first video call comprises:
sending a session request to the telephone network node based on the IP network connection in response to the first video call, where the session request including an identification of the video server; and
receiving a session confirmation sent by the telephone network node based on the IP network connection, and establishing the first video channel, wherein the session confirmation includes the identification of the first dialing device.

17. The video server according to claim 16, wherein performing the channel combination on the first video channel and the second video channels comprises:
separately obtaining video call data of the first dialing device and video call data of the first IP terminal device and the second IP terminal device based on the first video channel of the first dialing device and the second video channels of the first IP terminal device and the second IP terminal device;
generating real-time combined call data according to the video call data of the first dialing device, the first IP terminal device and the second IP terminal device; and
separately sending the real-time combined call data to the first dialing device, the first IP terminal device and the second IP terminal device based on the first video channel of the first dialing device and the second video channels of the first IP terminal device and the second IP terminal device.

* * * * *